United States Patent
Schraub et al.

(10) Patent No.: US 8,520,222 B2
(45) Date of Patent: Aug. 27, 2013

(54) SYSTEM AND METHOD FOR IN SITU MONITORING OF TOP WAFER THICKNESS IN A STACK OF WAFERS

(75) Inventors: Frederic Anthony Schraub, San Luis Obispo, CA (US); Michael R. Vogtmann, San Luis Obispo, CA (US); Benjamin C. Smedley, San Luis Obispo, CA (US)

(73) Assignee: Strasbaugh, San Luis Obispo, CA (US)

( * ) Notice: Subject to any disclaimer, the term of this patent is extended or adjusted under 35 U.S.C. 154(b) by 8 days.

(21) Appl. No.: 13/291,800

(22) Filed: Nov. 8, 2011

(65) Prior Publication Data

US 2013/0114090 A1    May 9, 2013

(51) Int. Cl.
*G01B 11/28* (2006.01)

(52) U.S. Cl.
USPC .......................................................... 356/630

(58) Field of Classification Search
USPC .......................................................... 356/630
See application file for complete search history.

(56) References Cited

U.S. PATENT DOCUMENTS
2003/0084918 A1*   5/2003   Kim ................................ 134/1.2

FOREIGN PATENT DOCUMENTS
EP              1 108 979       * 12/2000

* cited by examiner

*Primary Examiner* — Tu Nguyen
(74) *Attorney, Agent, or Firm* — K. David Crockett, Esq.; Crockett & Crockett, PC

(57) ABSTRACT

A system for holding non-contact wafer probes over the surface of a wafer which includes a system for flushing the surface of the probe during grinding.

2 Claims, 2 Drawing Sheets

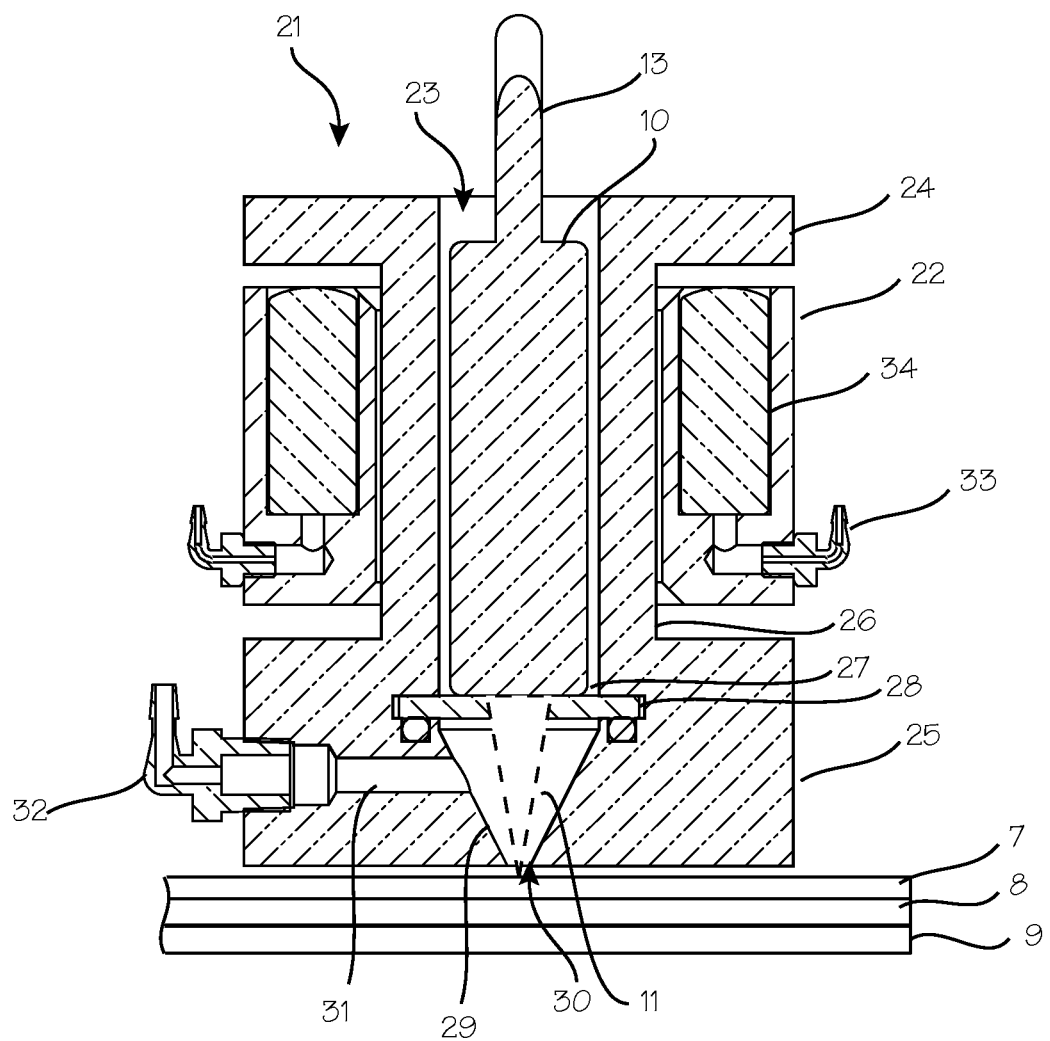

SYSTEM AND METHOD FOR IN SITU MONITORING OF TOP WAFER THICKNESS IN A STACK OF WAFERS

FIELD OF THE INVENTIONS

The inventions described below relate to the field of wafer processing and measurement of wafer thickness.

BACKGROUND OF THE INVENTIONS

Recent manufacturing techniques for computer chips require removal of a large portion of the base layer of silicon after the computer chips have been built up on the base layer. To remove the base layer, a wafer with numerous devices built up on the wafer is thinned in a process referred to as backgrinding. Backgrinding is accomplished after the devices are built up, but before the wafer is diced into individual computer chips. The goal of the backgrinding is to reduce the thickness of the base layer of silicon to a predetermined thickness. When the backgrinding process is used to reduce the thickness of the base wafer to such a thin dimension that the wafer is extremely weak, and is subject to easy breakage, the base wafer is sometimes mounted to another full-thickness wafer to provide handling strength. The wafer to be ground thin is attached to a carrier wafer by adhesive, by van der Waals forces, or other means, creating a stack of wafers. The thin wafer can then be processed with much less chance of breakage. The process is used for production of back-side illumination chips (for cameras), through-silicon vias, and 3-D vertically integrated circuit packages.

During grinding operations of single, non-stacked wafers, thickness is usually measured with a contact probe. The contact probe references the surface of the grind chuck prior to chucking the wafer. During the grinding, the contact probe maintains contact with the ground surface, permitting continuous monitoring of the wafer thickness. Contact probes are not always suitable for use with stacked wafers because they do not provide separate information of the top wafer thickness. Variations in carrier wafer thickness can lead to erroneous top wafer thickness measurement by the contact probe.

Non-contact probes that employ optical techniques, such as interferometry, can be used to measure the thickness of stacked wafers. However, during the grinding process, debris builds up on the back surface of the wafer so that the light emitted by the probe is blocked by the debris.

SUMMARY

The devices and methods described below provide for continuous monitoring of the thickness of silicon wafers during grinding processes despite the significant buildup of grinding debris (swarf) on the surface of the wafer during grinding.

The thickness of the top wafer (the wafer that is thinned) can be monitored during grinding with an optical probe and related processing systems. These probes and probe systems use interferometry to determine the thickness of the silicon layer or top layer. Interferometry requires the transmission of light from the probe toward the wafer, and detection of reflected light from the front (nearest the probe) surface and bottom surface of each wafer or layer of interest. The reflected light is analyzed with interferometry systems available from Tamar Technology and Precitec and others.

As described below, the probes can be positioned over the wafer, and suspended just above the wafer, with a stream of fluid directed downwardly from the probe or a fluid system vertically fixed to the probe. The fluid stream will also serve to carry away any swarf near the probe focal point, so that the light transmission from the probe and the reflected light from the wafer interfaces, will not be blocked by debris.

BRIEF DESCRIPTION OF THE DRAWINGS

FIG. 2 illustrates a non-contact probe in a probe holder adapted to eject fluid onto the wafer surface to wash swarf away from the probe focal point and suspend the probe above the wafer in order to maintain the correct distance and focal point for interferometric measuring.

DETAILED DESCRIPTION OF THE INVENTIONS

Figure 1:
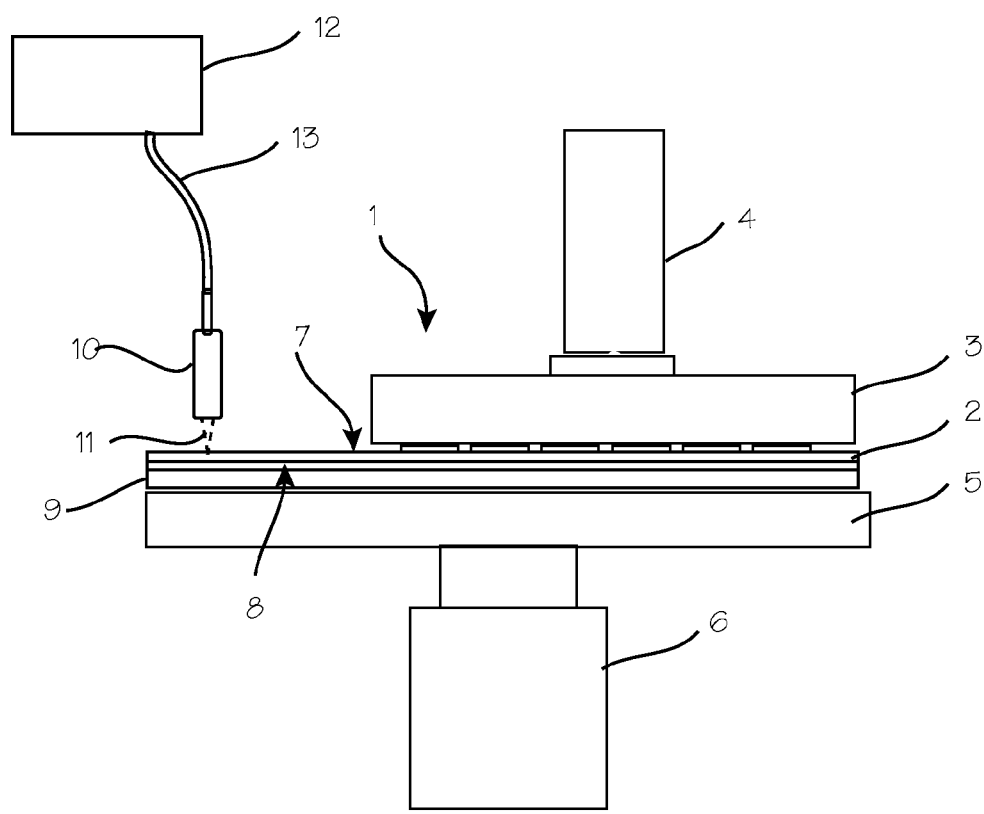
FIG. 1 illustrates the grinding system and a probe.

FIG. 1 illustrates the grinding process and a conventional non-contact probe and wafer in a grinding system 1. A wafer 2 is disposed below a grinding wheel 3. The grinding wheel is supported and rotated by the grinding wheel spindle 4, and the wafer is supported by the wafer holder/chuck 5 which in turn is supported and rotated by the wafer-chuck spindle 6. The wafer being processed may be a stacked wafer which includes a processed wafer with a silicon base layer 7 (and numerous other layers 8 built up upon its "front side") and a carrier wafer 9 under the processed wafer. During the grinding process, the optical probe system is operated to monitor the thickness of the silicon base layer of the top wafer as it is ground. The probe system includes probe body 10 which transmits light and receives reflected light through the probe light path 11. Light is typically transmitted from a remote light source 12, through optical conduit 13 (fiber optics or waveguide) and optical probe body, through the probe tip to the wafer. The light directed at the wafer reflects from the top surface of the wafer and every interface between the layers (so far as the light penetrates) and the reflected light is detected and analyzed to determine the thickness of the silicon base layer. The necessary processing equipment for determining the thickness of the silicon layer is located near the grinding components. The probe can be used to measure the thickness of the silicon base layer 7, the processed wafer (items 7 and 8), or the entire stack, including the processed wafer 7 and 8 and the carrier wafer 9.

FIG. 2 illustrates a non-contact optical probe in a probe holder 21 adapted to eject fluid onto the wafer surface to wash swarf away from the probe tip and the probe focal point. The fluid may also serve to lift and suspend the probe above the wafer. The probe holder 21 is suspended over the wafer with a suitable frame or stationary mount 22. The probe holder, as illustrated, includes a central bore 23 which accommodates the main body 10 of the probe, an upper flange 24, a lower flange 25, which establish a central section 26 of relatively smaller diameter than the flanges which accommodates the frame 22. In this arrangement, the probe holder may be slidably secured within the frame, such that it is able to translate upwardly and downwardly within the frame, or it may be vertically fixed to the frame. The probe may be secured within the housing with many mechanisms, and as illustrated the distal shoulder 27 of the probe is supported on a glass shield 28, which covers the entirety of the bottom of the bore hole and protects the sensitive probe optics and electronics from grinding fluids and swarf. The probe may instead rests on an inwardly extending flange, or intruding bottom of the bore hole. In the illustration, The light path 11 of the probe extends through the glass shield and the bore 29 extending downwardly from the bottom of the bore hole 23 toward its focal point proximate the processed wafer (items 7 and 8). The bore, as illustrated, is conical, but may also be a straight bore, and may be configured to match the probe light path (the focusing light path is typically conical). In the bottom portion of the housing, the conical bore 29 with a small outlet 30 at the bottom of the chamber provides a conduit and a flow path for fluid to exit the chamber and an optical pathway for the light necessary for interferometry to pass to and from the wafer. Fluid is provided to the chamber through conduit 31 and supply port 32, which in turn is supplied through appropriate connectors and supply lines, fluid reservoirs and pumps. The bottom surface of the probe holder is generally flat, and may be smooth or grooved to manipulate the flow of fluid from the center of the probe holder and outlet 30 to the periphery of the probe holder in order to enhance either the fluid clearance or the fluid bearing performance of the fluid. The area of the bottom surface may be adjusted, and the fluid pressure applied during grinding may be adjusted, to enhance the fluid bearing performance.

Hydraulic supply lines 33 feed hydraulic chambers or actuators 34, which may be pressurized to impinge on the bottom of the upper flange 24 and lift the probe holder. Pressurization of the chambers may be controlled to lift and/or lower the housing relative to the frame, and thus control the distance between the probe tip and the wafer surface. The hydraulic chambers or actuators can also be aligned (or additional hydraulic chambers or actuators can be provided) to impinge on the lower flange 25. The actuator is used to raise the probe height above the wafer surface to allow clearance for the robot end effector to pick up and place a wafer substrate on the work chuck top surface. The actuator may also be used to raise and/or lower the probe height above the wafer during grinding operations. The height adjusting function of the hydraulic actuators can also be accomplished with electro-mechanical actuators such as servo-motors, or any other means for adjusting the height. The actuators may be used to lift the probe to provide room for loading the chucked wafer, and may be used during the grinding process to adjust the height of the probe holder and probe relative to the stacked wafer.

In use, the grinding process is performed while the probe is operated to measure the thickness of the silicon base layer of the top wafer of the stack of the stacked wafer (or the entire processed wafer, or the entire wafer stack). During the grinding process, fluid (water, air, or other optically transmissive fluid sufficient to remove debris) is supplied through the supply line 32, and flows through the conical bore and out through the port in the bottom of the conical bore. Fluid may be applied at sufficient pressure to flush any debris away from the focal point area, to provide a clear optical pathway between the probe and the wafer. Additionally, fluid may be provided at sufficient pressure to slightly lift the probe and probe holder off the surface of the wafer and act as a fluid bearing between the probe holder and the wafer. The fluid pressure of the fluid may be in the range of 25 to 100 psi to accomplish these functions. If necessary, the actuators 34 may be pressurized through supply lines 33 to exert lifting force on the upper flanges 24 of the probe holder to lift the probe holder and hold the probe above the surface of the wafer. Also, if the actuators are directed downwardly to impinge on the lower flange, the actuators may be pressurized to exert downward force on the probe holder to counteract any lifting force created by the jet of water exiting the conical bore. Adjustment of the height of the probe using this method may be used to account for changes in the height of the wafer caused by chuck dressing. While the probe holder suspends the probe over the wafer surface, and the grinding system is operated as described above to remove material from the wafer, the probe and associated light source and electronics are operated to measure the thickness of the top wafer of the stack and/or the silicon layer of the top wafer of the stacked wafer and/or the entire wafer stack.

The method described above may be accomplished during a fine grinding step of wafer processing, after a rough grinding process. The method may be combined with other measurements, including pre-measurement of the stacked wafer assembly total thickness using other optical probe tools. The method may be augmented with the use of several non-contact probes, each mounted in the separate probe holder as described above, to obtain measurements at several locations on the wafer stack. The probe holder may also be moved over the surface of the wafer stack, on a pivot arm (or the wafer may be moved under the probe holder), to obtain measurements of wafer thickness over the wafer surface.

As described above, the system is used for performing in situ thickness measurement of a wafer thickness, or wafer layer thickness, during grinding operations in a grinding system. The system illustrated above generally includes an interferometry probe operable to measure thickness or a wafer or thickness of a layer of the wafer during grinding operations. The probe is characterized by a probe tip configured to be held proximate the wafer during grinding operations, such that the probe focal point is proximate the wafer. The probe holder is operable to hold the probe such that the probe focal point is proximate the wafer during grinding operations. The fluid supply conduit is aligned with an outlet proximate the probe tip and the light path from the probe to the wafer stack. A fluid supply, which may include a reservoir and a pump and any necessary valves and controls, is operable to provide fluid flow proximate the probe focal point.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A system for performing in situ thickness measurement of a wafer, or one or more layers of a wafer, during grinding operations in a grinding system, said system comprising:
   an optical probe system operable to measure thickness of a wafer or a layer of the wafer during grinding operations, said optical probe system comprising a probe characterized by a probe focal point;
   a probe holder operable to hold the probe such that the probe focal point is proximate the wafer during grinding operations, wherein the probe holder comprises a central section and an upper flange disposed near the upper end of the central section, with a first bore configured to accommodate the probe within the central section, and second bore disposed below the first bore configured to accommodate the probe light path;
   a fluid supply conduit with an outlet proximate the probe focal point, and a fluid supply operable to provide fluid flow proximate the probe focal point, wherein the fluid supply conduit passes through the probe holder and communicates with the second bore;
   a frame for holding the probe holder over the wafer during grinding operations; and an actuator disposed on or within the frame, said actuator being operable to impinge on the upper flange to raise and lower the probe holder relative to the wafer during grinding operations.

2. A system for performing in situ thickness measurement of a wafer, or one or more layers of a wafer, during grinding operations in a grinding system, said system comprising:

an optical probe system operable to measure thickness of a wafer or a layer of the wafer during grinding operations, said optical probe system comprising a probe characterized by a probe focal point;

a probe holder operable to hold the probe such that the probe focal point is proximate the wafer during grinding operations, wherein the probe holder comprises a central section and a lower flange disposed near the lower end the central section, with a first bore configured to accommodate the probe within the central section, and second bore disposed below the first bore configured to accommodate the probe light path;

a fluid supply conduit with an outlet proximate the probe focal point, and a fluid supply operable to provide fluid flow proximate the probe focal point; wherein the fluid supply conduit passes through the probe holder and communicates with the second bore;

a frame for holding the probe holder over the wafer during grinding operations; and an actuator disposed on or within the frame, said actuator being operable to impinge on the lower flange to exert a downward force on the probe holder.

* * * * *